(12) United States Patent
Giltner

(10) Patent No.: US 6,231,950 B1
(45) Date of Patent: May 15, 2001

(54) WOOD PRODUCT AND FINGER JOINT ARCHITECTURE

(75) Inventor: Jon X. Giltner, Boulder, CO (US)

(73) Assignee: ReConnX, Inc., Boulder, CO (US)

( * ) Notice: Subject to any disclaimer, the term of this patent is extended or adjusted under 35 U.S.C. 154(b) by 0 days.

(21) Appl. No.: 09/435,890

(22) Filed: Nov. 6, 1999

Related U.S. Application Data

(62) Division of application No. 08/971,638, filed on Nov. 17, 1997, now Pat. No. 5,985,415.

(51) Int. Cl.[7] .................................................. F16B 7/00
(52) U.S. Cl. ............................. 428/192; 428/60; 428/58; 403/364
(58) Field of Search ................. 428/60, 58, 192; 403/364; 52/726.1, 726.2

(56) References Cited

U.S. PATENT DOCUMENTS

| | | |
|---|---|---|
| 389,684 | 9/1888 | Beach . |
| 545,375 | 8/1895 | Olds . |
| 557,967 | 4/1896 | Carr . |
| 602,123 | * 4/1898 | Brandon et al. ................... 403/364 |
| 2,267,330 | 12/1941 | Goss . |
| 3,355,196 | 11/1967 | Harrison . |
| 3,692,340 | 9/1972 | Roth . |
| 3,970,401 | 7/1976 | Lubeck . |
| 4,624,295 | 11/1986 | Howland . |
| 5,584,328 | 12/1996 | Grisley . |
| 5,985,415 | * 11/1999 | Giltner ................................ 428/60 |

FOREIGN PATENT DOCUMENTS 266564  1/1932 (IT) .

OTHER PUBLICATIONS

Western Wood Products Association; "Structural–Glued Lumber", Jan. 1995.

\* cited by examiner

*Primary Examiner*—Alexander S. Thomas
(74) *Attorney, Agent, or Firm*—Harold A. Burdick

(57) ABSTRACT

A finger joint architecture, method and formation apparatus are disclosed, the finger joint architecture characterized by an array of interspersed projections and cavities formed at an end face of a first wood product. The projections are spaced from one another in both first and second dimensions defining the end face and are formed by the cavities which are bored through the end face. A mating array of projections and cavities is formed at an end of another wood product to be secured to the first wood product. The projections and cavities thus formed are preferably tapered.

11 Claims, 12 Drawing Sheets

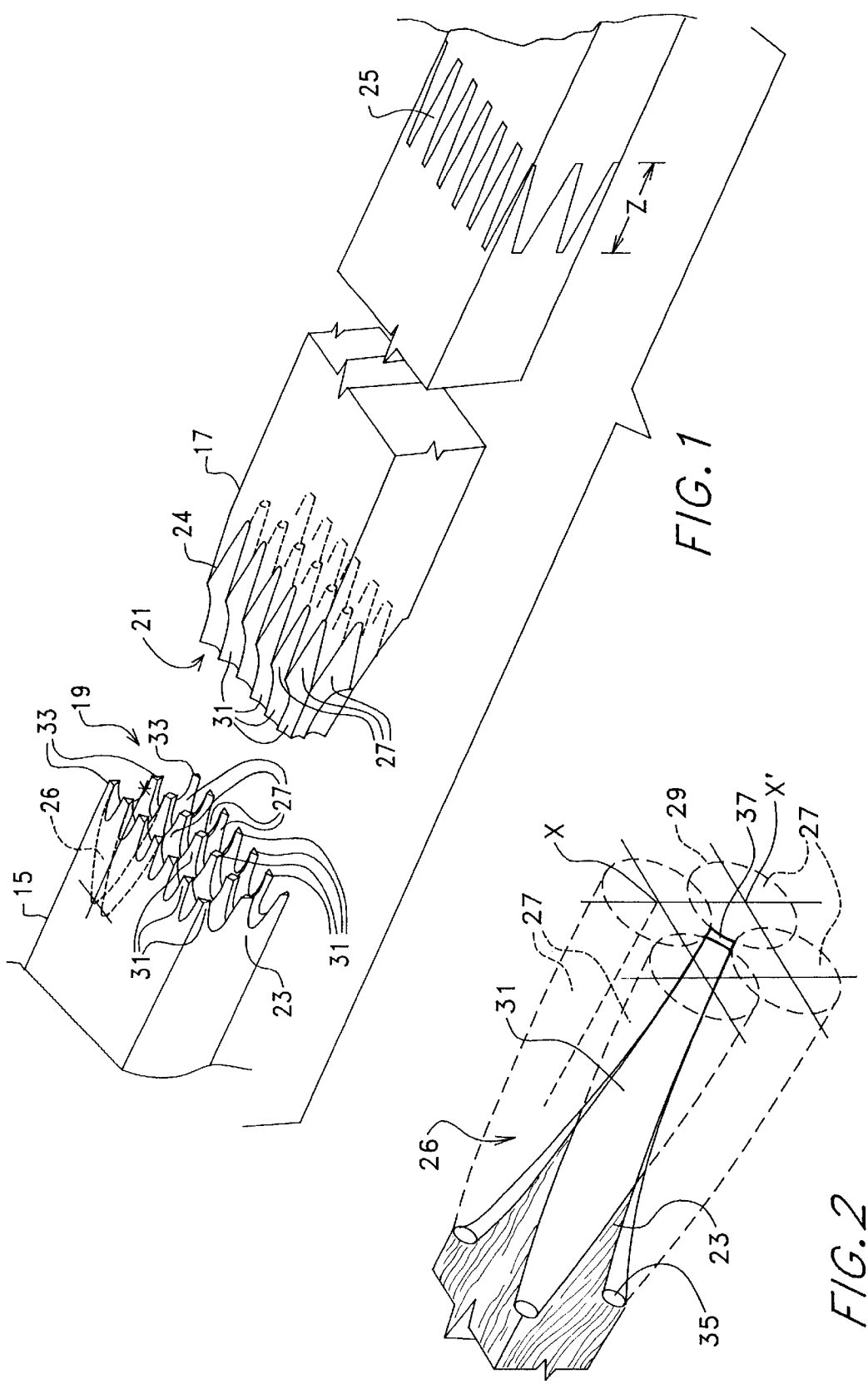

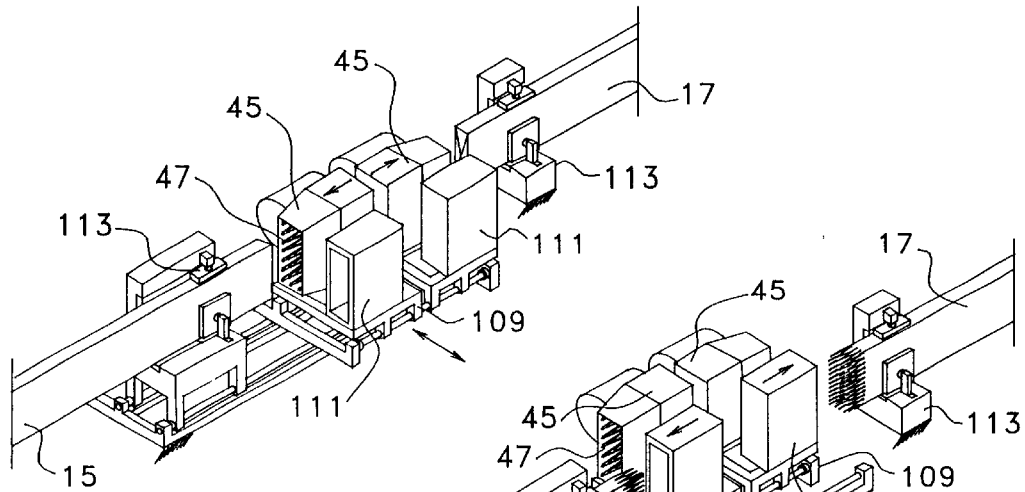
FIG. 10A
FIG. 10B
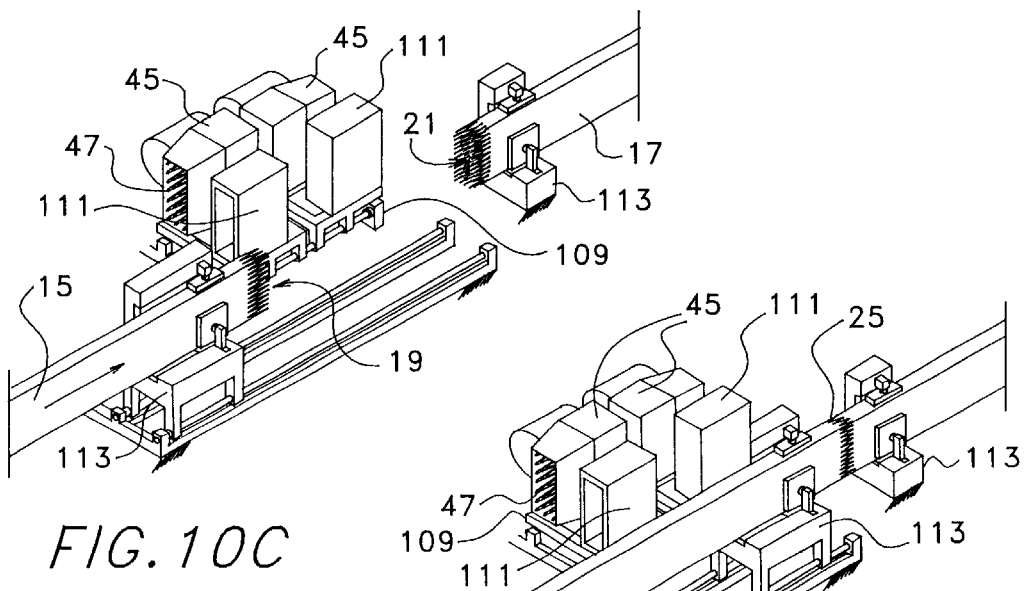
FIG. 10C
FIG. 10D

WOOD PRODUCT AND FINGER JOINT ARCHITECTURE

PRIOR APPLICATION

This application is a division of now pending U.S. patent application Ser. No. 08/971,638 filed Nov. 17, 1997, U.S. Pat. No. 5,985,415 and entitled FINGER JOINT ARCHITECTURE FOR WOOD PRODUCTS, AND METHOD AND APPARATUS FOR FORMATION THEREOF by Jon X. Giltner.

FIELD OF THE INVENTION

This invention relates to joints utilized for joining smaller segments of wood products to form larger segments, and, more particularly, relates to finger joints and methods and apparatus for formation of such finger joints.

BACKGROUND OF THE INVENTION

Structural glue-jointed wood products, such as dimensional lumber, is gaining greater acceptance for a wide variety of applications in the building and construction industry. Recognition that efficient utilization of wood resources will continue to be necessary, that reduction of flow to local land fills is a priority in many locations, and cost and reliability factors have continued to fuel the desire to make more of such jointed product available.

However, current finger-jointing technology has not changed substantially to keep pace with the demand. Scarf joints and finger joints of various types have long been utilized, improvements lying primarily in the field of new adhesives and/or adhesive application techniques. While many are acceptable for some applications, few if any of the known joints have proved effective for application under all significant loading conditions (tension, compression, bending, torsion and shear).

Moreover, greater efficiencies and ease of manufacture could still be utilized. Scarf joints, for example, require large amounts of wood removal for joint construction. Most current finger joint production requires provision of large-scale (and, thus, centralized) production facilities, thereby necessitating shipment of scrap lumber to the facility, often from great distances. Specialized handling of jointed materials due to fragility of the freshly glued joints is also often required. The shipping requirement increases cost and energy consumption for production, and deters many non-local companies from use of this alternative, while the special handling requirements increase cost and space requisites (production and storage) of such facilities. In addition to the high cost of industrial finger jointing equipment, smaller scale operations are thus discouraged.

Additionally, traditional facilities are not able to process post-consumer, possibly contaminated, lumber because the blades necessary for production of known joints are at risk of damage by foreign materials commonly found in post-construction scrap, demolition scrap, and the like. A finger joint construction modeled for use of such post-consumer scrap would, if accepted, greatly reduce the volume of land filled construction and demolition waste.

SUMMARY OF THE INVENTION

This invention provides a finger joint architecture, formation method and apparatus designed for use with all variety of wood product (including dimensional lumber and logs, without regard to species), including post-consumer scrap, and for utilization without regard to the particular loading conditions (tension, compression, bending, torsion and/or shear) which may be encountered. The finger joint architecture and formation method is well adapted to smaller scale operations than heretofore known, including mobile manufacturing sites. Specialized handling of freshly jointed materials is not required, and wood removal in manufacture is minimized.

The finger joint architecture of this invention is formed at a surface area of a first wood product and is adapted for securement at a selectively configured formation in a second wood product. The finger joint architecture is characterized by plural series of projecting members, the projecting members in any one series being spaced from one another and from the projecting members in any adjacent series. The projecting members are defined by a plurality of longitudinal cavities bored through the surface area into the wood product.

The jointed wood product thus formed when the first and second wood products are adhesively secured at the joint is characterized by a joint cross section showing plural nonlinear adhesive lines, at least some of which are endless defining plural wood product interfaces entirely interior the joint cross section.

The joint forming method of this invention includes the steps of forming in a first wood product section end an array of interrelated projections and cavities interspersed in both first and second dimensions relative to an end face of the first wood product section end. A mating array of interrelated projections and cavities is formed in a second wood product section end, the first and second wood product section ends thus arrayed being joined. The projections are preferably tapered in the direction of projection comprising a third dimension relative to the first and second dimensions. The cavities are also preferably tapered.

The apparatus for formation of a joint architecture at a selected surface area of a wood product of this invention includes a plurality of rows of spaced cavity forming means, drive structure for driving the cavity forming means, and a guide for directing the wood product at the cavity forming means.

It is therefore an object of this invention to provide an improved finger joint architecture and finger joint formation method and apparatus.

It is another object of this invention to provide a finger joint architecture, formation method and apparatus designed for use with all variety of wood product, including post-consumer scrap, and for a variety of utilization conditions.

It is still another object of this invention to provide a finger joint architecture and formation method and apparatus well adapted to small scale operations, requiring little or no specialized handling of freshly jointed materials, and that minimizes wood product waste.

It is yet another object of this invention to provide a finger joint architecture formed at a surface area of a first wood product and adapted for securement at a selectively configured formation in a second wood product, the finger joint architecture characterized by plural series of projecting members wherein the projecting members in any one series are spaced from one another and from the projecting members in any adjacent series.

It is still another object of this invention to provide a wood product formed from at least first and second wood product sections adhesively secured at a joint characterized by a joint cross section showing plural nonlinear adhesive lines.

It is still another object of this invention to provide a wood product having a joint wherein at least some adhesive lines shown at a joint cross section are endless thus defining plural first and second wood product section interfaces entirely interior the joint cross section.

It is yet another object of this invention to provide a joint forming method for wood products including the steps of forming in a first wood product section end an array of interrelated projections and cavities interspersed in both first and second dimensions relative to an end face of the first wood product section end, forming a mating array of interrelated projections and cavities in a second wood product section end, and joining the first and second wood product section ends thus arrayed.

It is yet another object of this invention to provide an apparatus for formation of a joint architecture at a selected surface area of a wood product having a plurality of rows of spaced cavity forming means, drive structure for driving the cavity forming means, and a guide for directing the wood product at the cavity forming means to thus form the architecture at the selected surface area.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is an exploded perspective view of a finger joint in accord with this invention;

FIG. 2 is an enlarged partial perspective view of a portion of the finger joint architecture illustrated in FIG. 1;

FIGS. 10A through 10D are perspective views illustrating use of the apparatus of FIG. 7 (in combination) to practice the method of this invention;

DESCRIPTION OF THE INVENTION

Figures 3A, 3B:
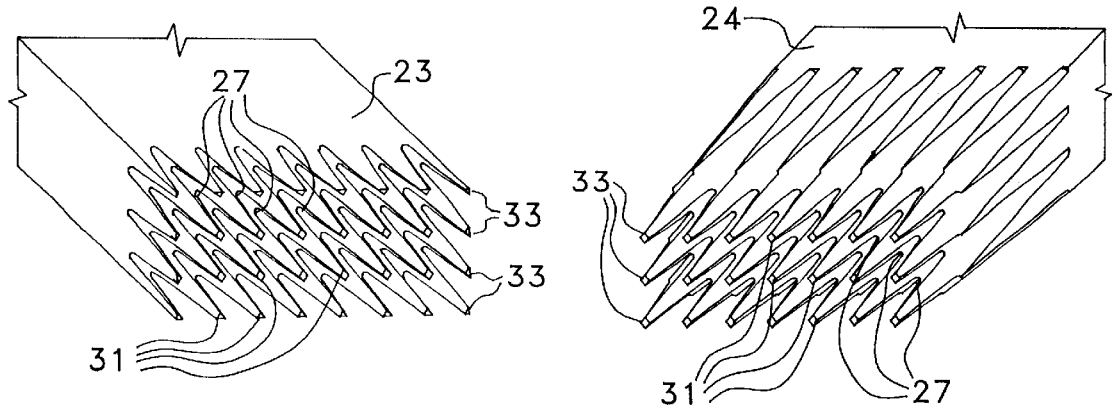
FIG. 3A is a perspective end view showing the finger joint architecture as formed at a first section end of a particular dimensional wood product.
FIG. 3B is a perspective end view showing the mating finger joint architecture to that shown in FIG. 3A as formed at a second section end.

FIG. 1 shows two wood product (in this case dimensional lumber) sections, or segments, 15 and 17 having finger joint architecture 19 and mating architecture 21 formed at the ends 23 and 24 thereof, respectively. The sections are aligned for joining (with a gap-filling adhesive application, the nature of the adhesive utilized being any of those currently known for the intended use) to form a finished joint, as shown at 25, and thereby a unitary wood product.

Wood is orthotropic, i.e., having different mechanical properties in the directions of three mutually perpendicular axes, longitudinal, radial, and tangential. The finger joint architecture and method of this invention is particularly well adapted to applications along the longitudinal axis (i.e., parallel to the wood grain generally parallel with the wood product segment's length), the axis of greatest strength. Each wood product section may be of any dimension regarding length, width, or thickness, any species, may have any moisture content, any degree of curvature, twist, or straightness, any quantity, size, and arrangement of checks, splits, and knots parallel to grain or perpendicular to grain, and any strength.

At each section end, the wood fibers in the immediate length Z of the proposed joint, and for the full cross sectional area of the joint, should be sound and machineable, and for best results should be reasonably parallel within the length Z. Specifically, checks and splits may be present, but preferably not sizeable knots. For used lumber, foreign matter, such as embedded concrete or nails, should not be present, but small holes remaining from removed foreign matter present no problems.

FIG. 2 shows a detailed interrelated portion 26 of architecture 19. The dotted lines represent areas of removed matter forming cavities, or bores, 27 through uninterrupted surface area (end face) 29 into section end 23. Immediately adjacent cavities 27 define projections, or tenons, 31, the overall array of interrelated cavities and projections being thus interspersed in both first and second dimensions defining end face 29, the projections extending in a third dimension roughly parallel to the longitudinal axis of the wood grain. When thus arrayed (as best shown in FIGS. 3A and 3B illustrating mating arrays at the end of 2×6 sections), an architecture characterized by plural spaced series, or rows, 33 of projections 31 (spaced from one another in each series) results.

In formation of each joint architecture at each section end, section ends are cut square. Cavities 27 are drilled, or bored, substantially perpendicularly to the square cut end face, the cavities preferably being tapered (utilizing tapered bits with deep flutes for quick chip removal, the flutes set at inclination angles, relative to the tool axis, of about 45° or more allowing cutting with the grain instead of across the grain as much as possible). The series 33 of projections defined by the array may be orthogonal, but need not be, and the rows need not be straight. The longitudinal profile of cavities may vary from cavity to cavity, and so may cavity spacing.

Figures 4A, 4B:
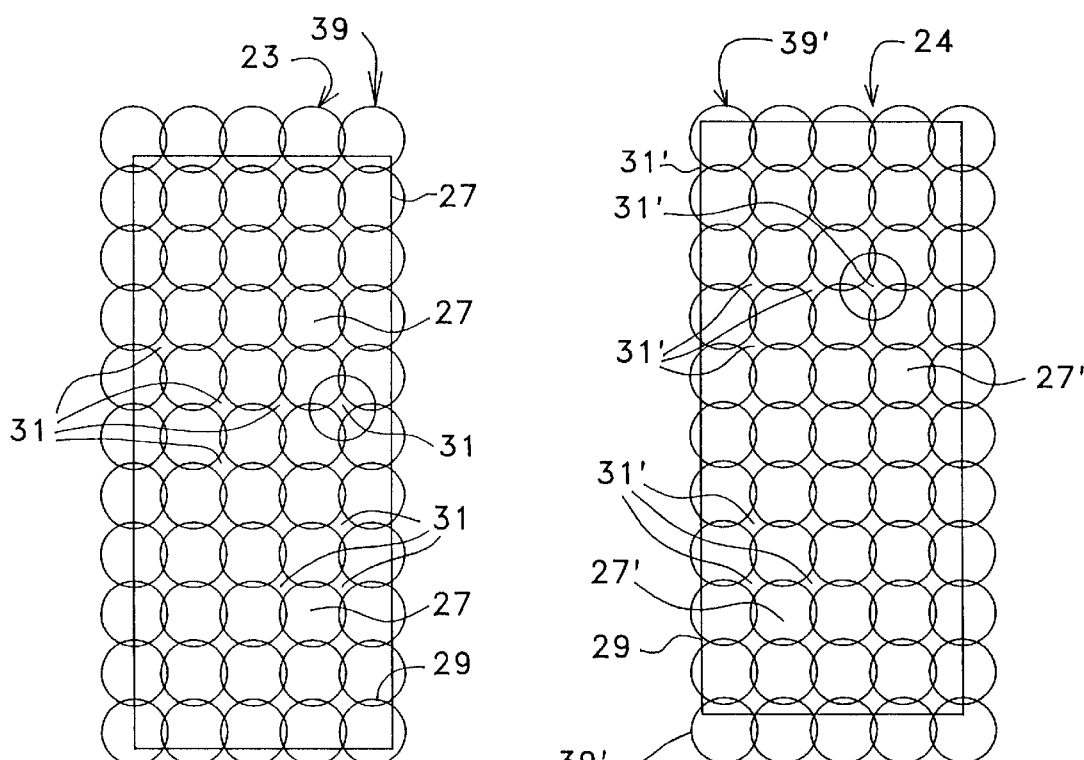
FIG. 4A is an end view illustrative of a bore pattern utilized to form a first matable finger joint architecture in a first wood product section.
FIG. 4B is a reflection of an end view illustrative of a bore pattern utilized to form a second finger joint architecture in a second wood product section and matable with the architecture of FIG. 4A.

As shown in FIGS. 3B and 4A and 4B, the bore pattern for mating joint architectures must be shifted (3A/4A relative to 3B/4B) so that the mating architectures can be joined, with projections 31 at one end section receivable in cavities 27 of the other end section and vice versa. For the orthogonal arrays as illustrated in the FIGURES, a shifting of one half of the diagonal bore spacing (bore axis to bore axis as shown in FIG. 2, from X to X', and FIGS. 4A and 4B) is required. Bore diameter at the end face may be any size relative to bore spacing, but in an orthogonal array preferably slightly larger than axis to axis spacing (but preferably not larger than the distance between bore axis of bores diagonally opposite a projection 31; see FIG. 2).

For best results, the cross sectional area of bores at point of deepest penetration 35 is preferably slightly greater than the cross sectional area of tips 37 of projections 31. The longitudinal profile of cavities 27 are preferably, but not necessarily, such that at any point along their length, their transverse cross sectional areas are large enough so that the opposing projections 31 can fit together with an adequate volume of adhesive (see FIGS. 5 and 6A through 6G). While liberal space is illustrated for bore/tenon interface in FIGS. 6A through 6G (where ease of fit but large adhesive volume is indicated), it is to be realized that bore sizing and spacing could be different, including relative configuration such that projections 31 fit tightly into cavities 27, using much less adhesive, and to the point that, under force, projections 31 cross sections will remold to fill the related cavity substantially entirely.

As shown in FIGS. 4A and 4B, partial bores 39 at the edges of the joint architecture are required so that the bore pattern extends throughout the end face. To assure a reasonably smooth wood surface, clamps (as discussed and shown hereinbelow) may be applied perpendicular to grain on one or both orthogonal axes of the joint during assembly to guide perimeter fibers. In addition, adhesives having lubricating qualities during assembly, midrange set times, and meeting structural and environmental requirements and standards will provide best results. For fully structural joints, gap-filling phenol-resorcinol adhesive with suitable filler will provide the best results (suitable adhesives have been developed by Neste Resins North America, for example).

Figure 5:
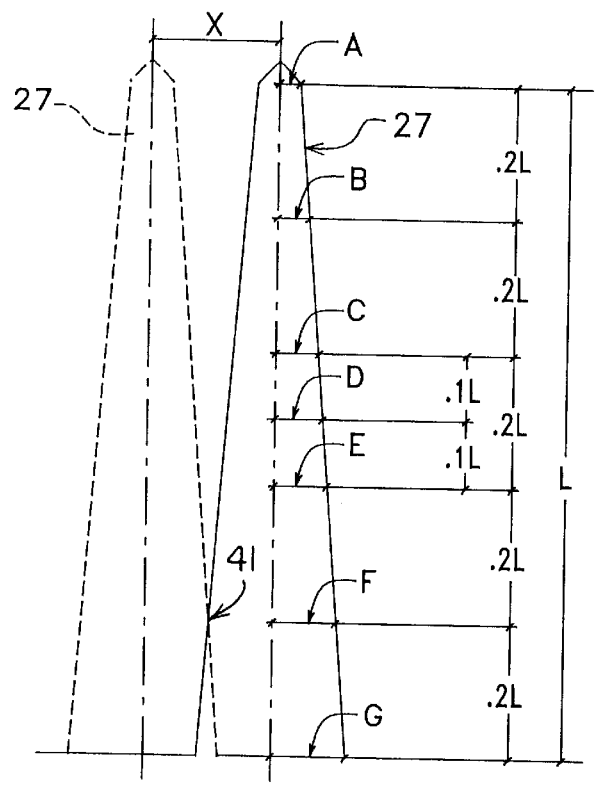
FIG. 5 is an illustration of a currently preferred bore profile.

As illustrated in FIG. 5, bore profiles of cavities 27 (and so resulting tenon profiles) need not be, and perhaps preferably are not, linearly tapered profiles from end to end, any narrowing profile (i.e., tapering in general), being preferred. Moreover, cavities 27 can be of any length L and spacing X. Varying the ratio of L/X will vary joint strength in much the same way as does varying length/pitch ratio of conventional finger joints. In conventional finger joints, minimizing the tip thickness of a wood product and the corresponding finger joint groove thickness of the opposing wood product has been shown by past research to increase joint strength (i.e., less wood is removed by minimizing tip and groove thickness thus increasing joint strength). As may be appreciated, the effective tip width of a tenon of this invention (and so cavity volume) may be further minimized over effective prior art tip thickness.

Where the bore pattern selection is such that cavity diameters intersect at the wood product section end face (as shown in FIGS. 3), ridges 41 are created between adjacent projections, or tenons, the depth from the end face of the ridges being dependent upon bore spacing, diameter and profile. When assembled, ridges 41 of the two end sections intersect causing splitting between fibers. As the joint continues to be assembled under end pressure, the adhesive lubricates the wood surfaces to facilitate maximum depth of assembly. As tenons 31 reach farther into the bores, the opposing ridges 41 interfere and lateral pressure builds between opposing tenon surfaces until refusal is reached, with the tenons fully seated in the cavities. At that point, a rigid mechanical bond is formed between opposing end sections, which allows handling during curing of the adhesive with only minimal care.

Figures 6A, 6B:
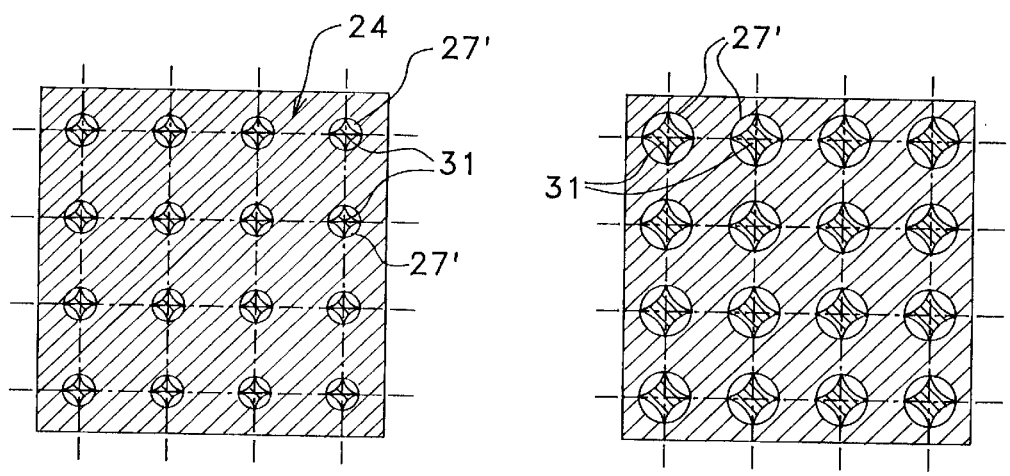
FIGS. 6A through 6G are schemata sectionally illustrating one embodiment of a completed joint.
Figure 6C:
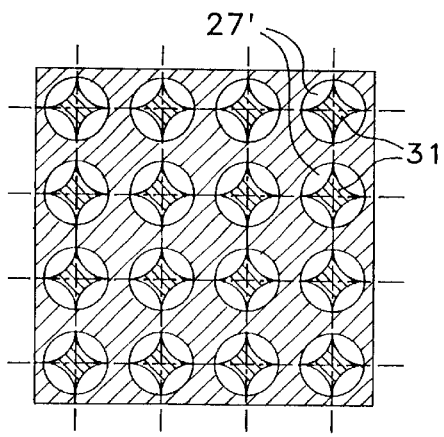
Figure 6D:
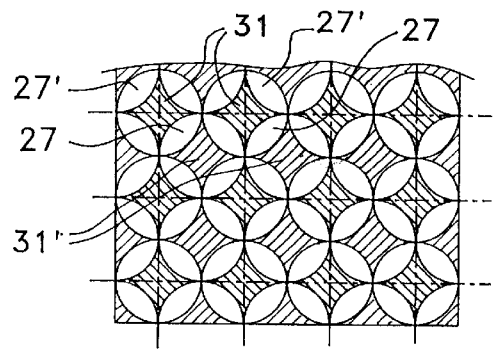
Figure 6E:
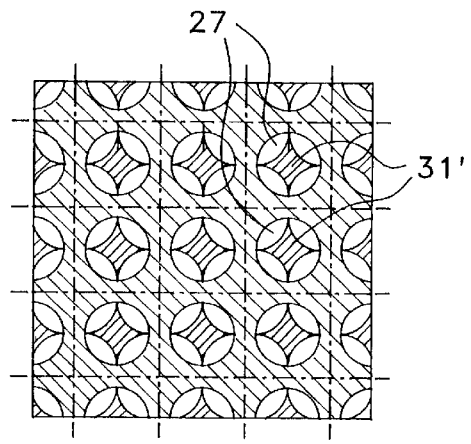
Figure 6F:
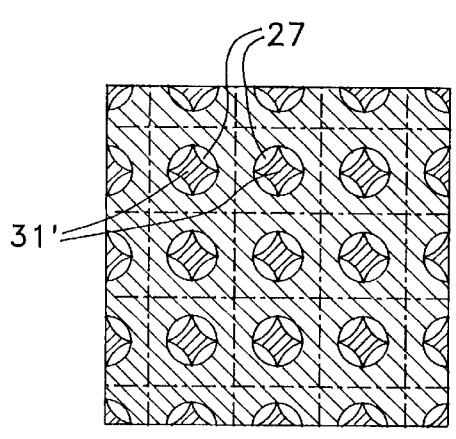
Figure 6G:
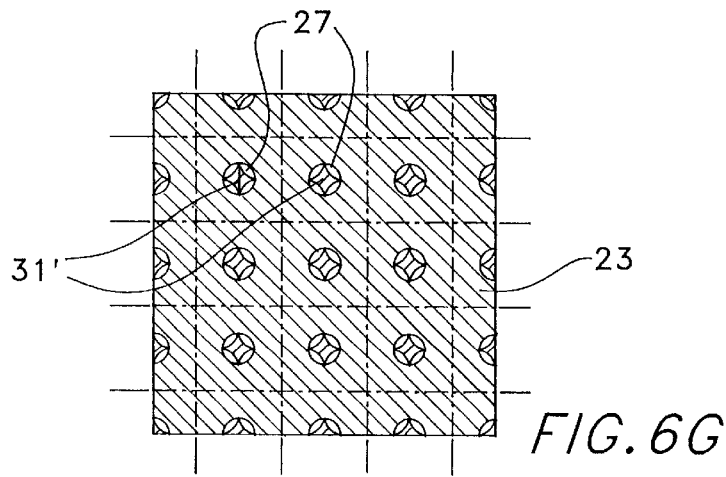

FIGS. 6A through 6G, with reference to bore depths shown in FIG. 5, illustrate joint cross sections at different bore depths and with projections 31 of one end section 23 secured in cavities 27' of the other end section 24 and with projections 31' of the end section 24 secured in cavities 27 of the end section 23. At the midpoint depth D as shown in FIG. 6D, neither end section (23 or 24) dominates the joint. Plural nonlinear, variable thickness, adhesive interfaces (the boundaries of which in this case are similar to those of the vesica pisces form) are indicated at all depths, most of which are endless adhesive lines corresponding to cavity circumference. Thus, most tenon/bore interfaces are interior the joint cross section and are thereby not subject to environmental degradation.

Testing of the joint architecture of this invention indicates that structurally competitive wood products can be produced from a wide range of species and lumber types. No material geometric non-linearities (stress/strain curve) are introduced as a result of joint design, and, using adequate length/pitch ratios, flexural strength approaches that, in most cases, of solid sawn (i.e., unjointed) lumber of the same species, type, and grade.

Turning now to FIGS. 7 through 10, apparatus 45 is illustrated, the apparatus comprising a tool used in formation of the joint architecture of this invention. FIGS. 7 and 8A through 8D are sectional illustrations, divided at their centers to indicate that the apparatus may be expanded to meet wood product size requirements as necessary and utilizing the same principals as shown. FIGS. 9A through 9D correspond in section to FIGS. 8A through 8D and illustrate one embodiment of the apparatus as it might be configured for a particular dimensional lumber, in this case a 2×6 producing the joint architecture as illustrated in FIG. 3A.

A plurality (number selected to the architecture desired) of bits 47, each with a profile selected to produce the desired bore profile of cavities 27, are mounted at shafts 49 thereof in cylindrical sleeves 51 of bearing/drive shafts 53. Bits, shafts, and other moving and structural members are made of those materials known to skilled machine and tool manufacturers to meet the demands of the process. Shafts 49 and sleeves 51 diameters and connection characteristics are selected to permit failure in torsion of the shaft static connection to the sleeve in the event bits 47 encounter foreign objects in the wood product, such as nails, cement, bolts or the like.

Drive shafts 53 act as bearings, rolling against and restrained by adjacent parallel bearing/drive shafts and substantially filling tool casing 55. Restraint for perimeter ones of the shafts 53 is provided by rollers 57 mounted on shafts 59 anchored at frame member 61. Shaft recesses 63 are provided to accommodate compressed air delivery from port 65 to and around the machinery through passages 67 defined by adjacent recesses 63 of different shafts, and ultimately out of apparatus 45 between bits 49 to hood 69 and into a shop vacuum system through funnel 71. Air relief ports 73 are provided as is known to control air movement.

Concentric shoulders 75 of shafts 53 transfer axial thrust loads during drilling into rigid bulkhead 77 rigidly attached to casing 55. Shafts 53 are maintained through durable thrust bearings 79 mounted firmly in bulkhead 77. Shafts 53 are milled at an intermediate length of their terminal ends 81 into a suitable shape (square, hexagonal or the like) for use as a spline at a maximum diameter equal to or less than the shaft diameter. Spur gears 83 are mounted thereat with a snug but sliding fit, the spur gears configured to engage adjacent gears on diagonally adjacent shafts thus restraining position of gears within gear box 85. Power transfer gears 87 complete the bit drive set 89, each power transfer gear 87 engaging a pair of gears 83.

Shaft termini 91 are mounted through thrust bearings 93 firmly mounted in bulkhead 95 (bulkheads and casing are suitably fastened to one another to facilitate disassembly). Shafts 53 are retained thereat by washer and retaining clips 97. Power transfer gears 87 are keyed to shafts 99 rotatably maintained through bushings mounted in the bulkheads. Chain sprocket gears 101 are keyed to shafts 99, or, in the alternative, may be anchored to gears 87 (in which case, the gear combinations would be rotatably mounted on fixed shafts 99).

Drive chain 103 engages drive sprocket 105 (connected with shaft 106 of, or linked to, an electric motor, not shown), take-up sprockets 107 and sprocket gears 101, the drive sprocket and take-up sprockets being appropriately rotationally mounted in gear box 85. Alternative drive systems could be utilized employing pneumatics, hydraulics, or other known drive techniques as shown hereinafter.

Turning now to FIGS. 10A through 10D, apparatus 45 is shown in a combination tool for carrying out joint architecture formation and joint securement with minimal lateral movement of wood segments as may be required, for example, for large timbers. Apparatus 45 are firmly anchored at movable work surfaces 109, opposing apparatus 45 being provided with differently configured bit arrangements to form mating architecture as discussed above. Adhesive application systems 111 are mounted at surface 109, as may be a metal detecting stage (not shown) upstream of apparatus 45.

Wood product sections 15 and 17 are guided in clamp blocks 113 (the sections having been previously square cut), one or both of which are slidably maintained in a track system at a work surface and which are preferably designed to center the wood section. After the ends are scanned for foreign matter, the blocks are moved toward apparatus 45, or apparatus 45 are moved toward the wood product section ends depending on floor configuration. In either case, bits 47 are thrust into the square cut end faces of sections 15 and 17 to the required depth. Utilization of plural bore operations may be necessary, for example where the maximum boring diameters of adjacent bores are of such size that they intersect at wood product surfaces as shown in FIGS. 2 and 4. In such case a sequence of boring operations, consisting of a first array of bores formed by a first operation at apparatus 45 followed by an appropriate lateral shift of the end face of section 15/17 and a second operation forming a second array of interspersed bores, allows adequate space between bits 47 to avoid bit interference and better removal of wood byproducts and possible foreign matter created during cutting operations.

Once the interrelated cavities and projections are formed, work surface 109 is shifted to align the formed joint architecture at each section with adhesive application systems 111, whereupon movement causes engagement of the application systems and joint architecture for adhesive coating. After coating, work surface 109 is again shifted so that the coated ends may be brought into engagement with selectively applied end pressure to finish joint 25. As discussed hereinabove, the mechanical bond achieved by the joint architecture of this invention allows almost immediate release of the finished jointed wood product from blocks 113 and movement to storage with only minimal care for the fresh joint.

Figure 11:
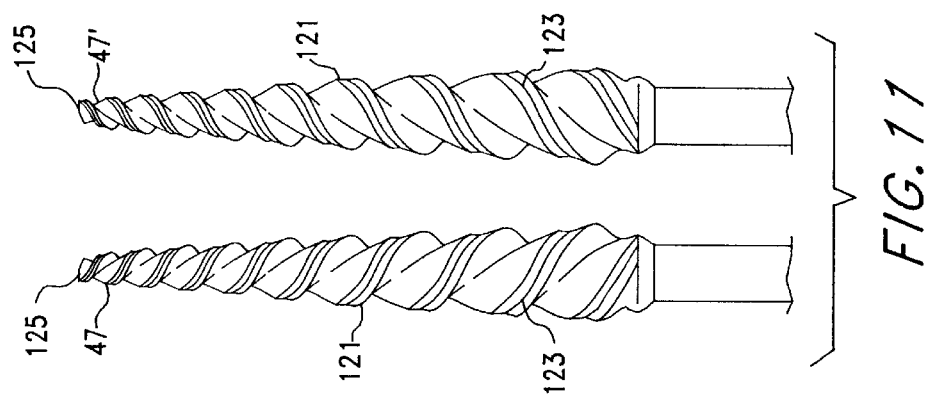
FIG. 11 is a side elevation view of a pair of adjacent cutting bits found in a bit array as shown in FIGS. 10A through 10D.

FIG. 11 illustrates two adjacent bits 47 (47 and 47') found at the bit array of apparatus 45. The bits are up cut to pull cuttings out of the bore during operations. Spirals 121 are preferably about 45° spirals with a concave cutting faces 123. Each bit is preferably sized and spaced to allow proper bore array formation without bit interference (for example, for bits with a cutting surface length of about 3.0", a bit diameter at cutting tool base of about ⅝", bit spacing of about ¾" and tips 125 about 0.15" diameter.

Figure 7:
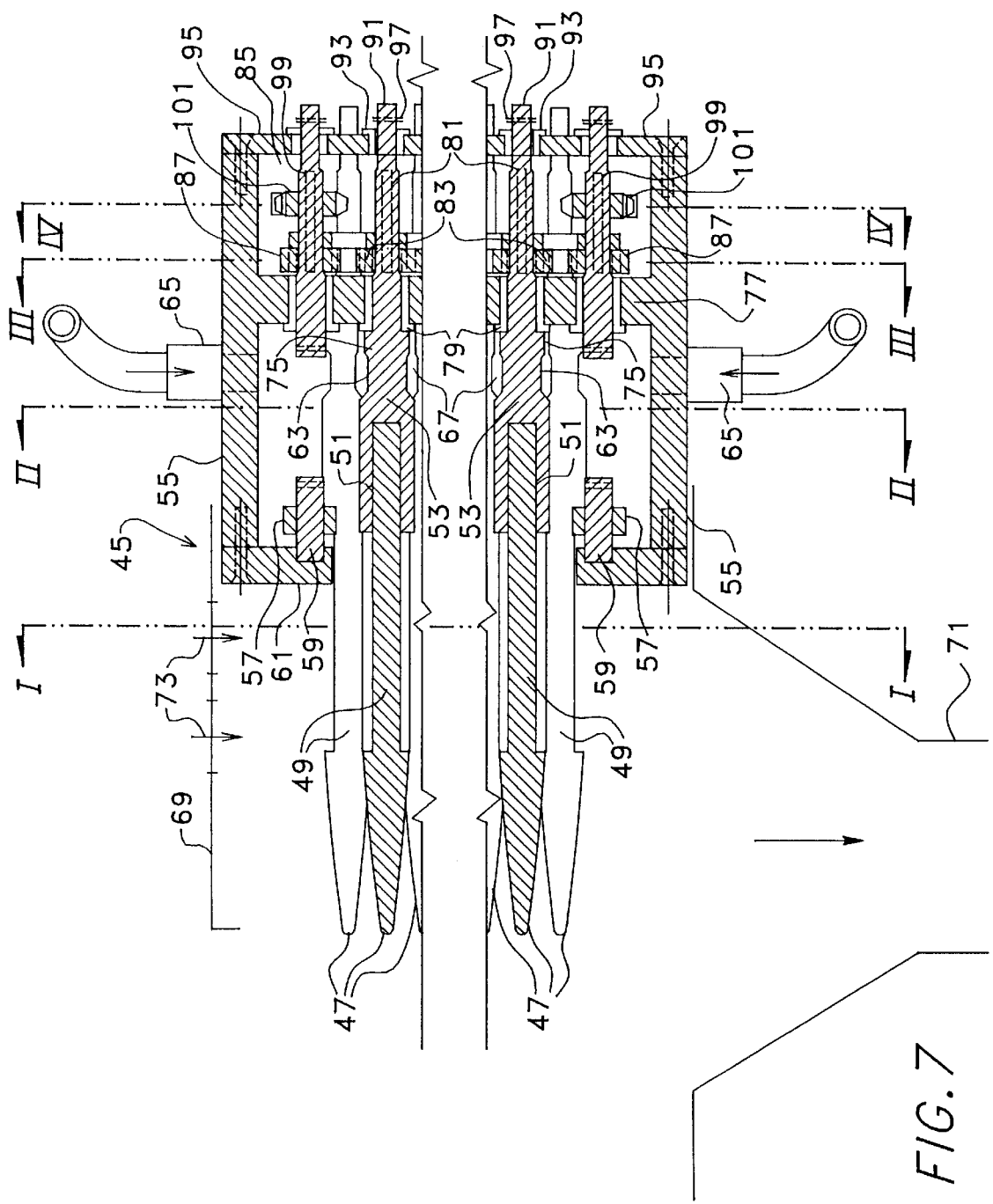
FIG. 7 is an illustration of an apparatus for forming the finger joint architecture in accord with this invention.
Figure 8A:
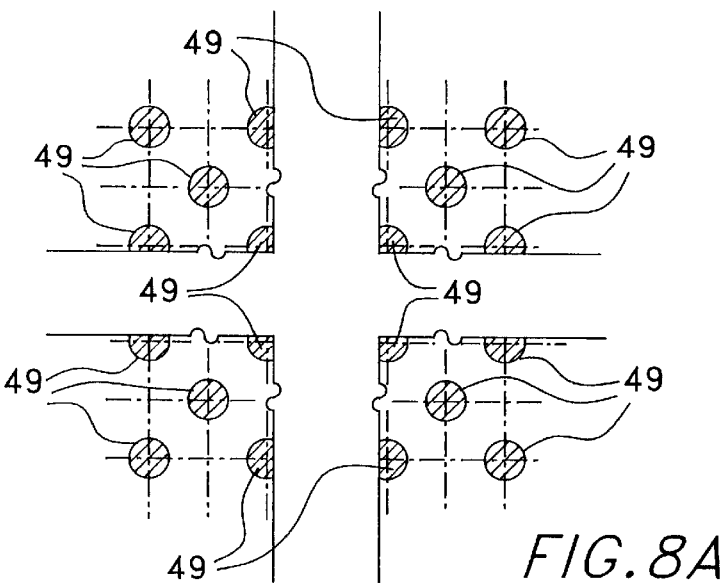
FIGS. 8A through 8D are sectional illustrations of the apparatus with reference to that illustrated in FIG. 7 (FIG. 8A taken along section lines I—I of FIG. 7, FIG. 8B taken along section lines II—II of FIG. 7, FIG. 8C taken along section lines III—III of FIG. 7, and FIG. 8D taken along section lines IV—IV of FIG. 7)
Figure 8B:
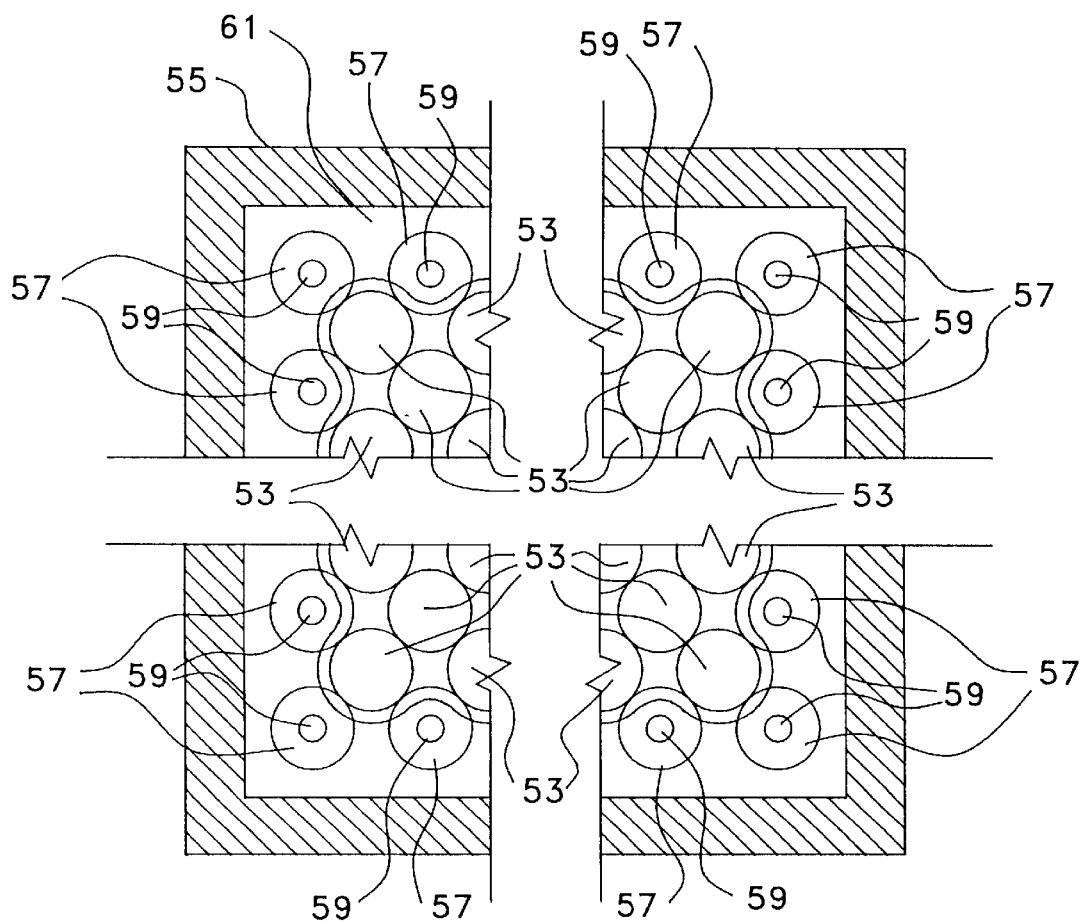
Figure 8C:
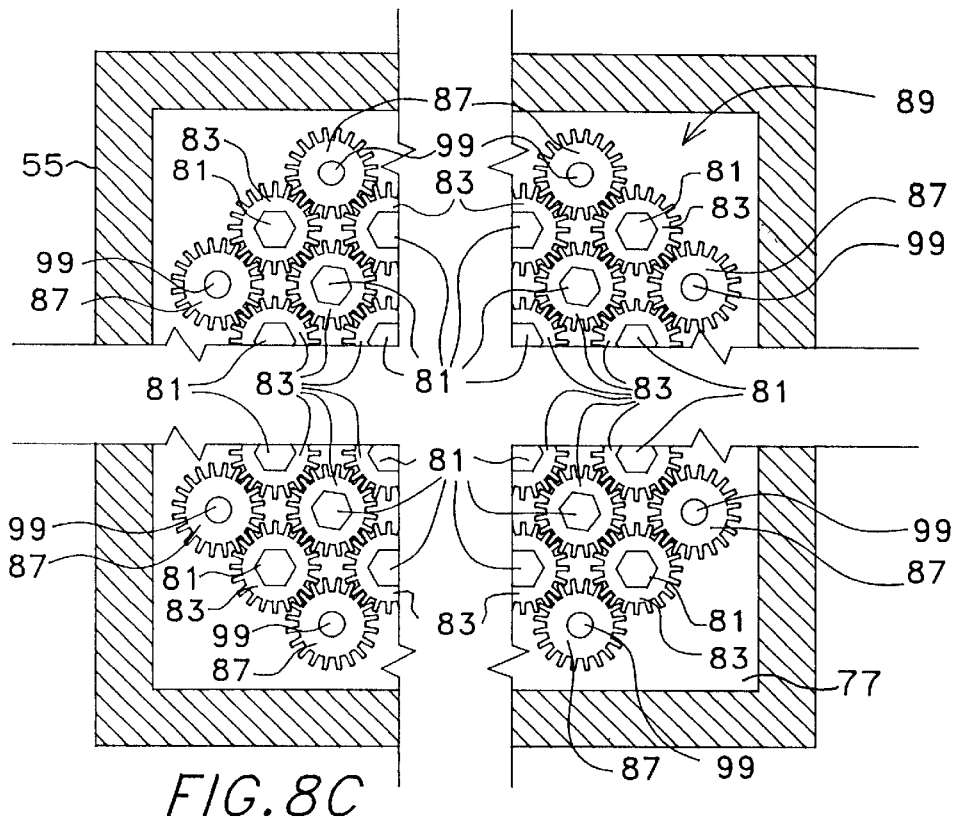
Figure 8D:
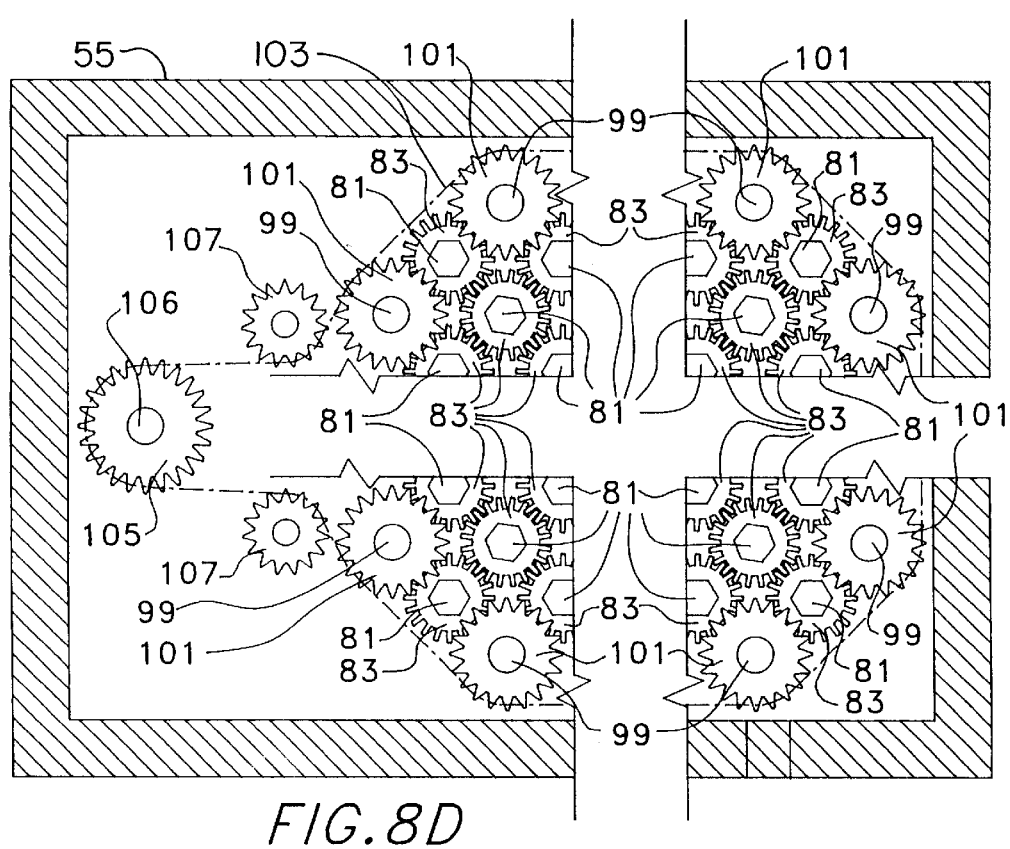
Figure 9A:
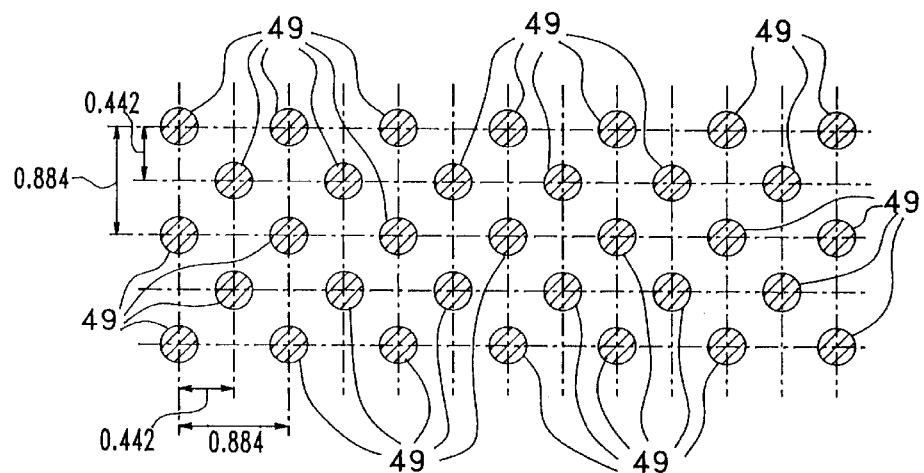
FIGS. 9A through 9D are sectional illustrations of an apparatus appropriate for finger joint architecture formation as shown in FIG. 3A.
Figure 9B:
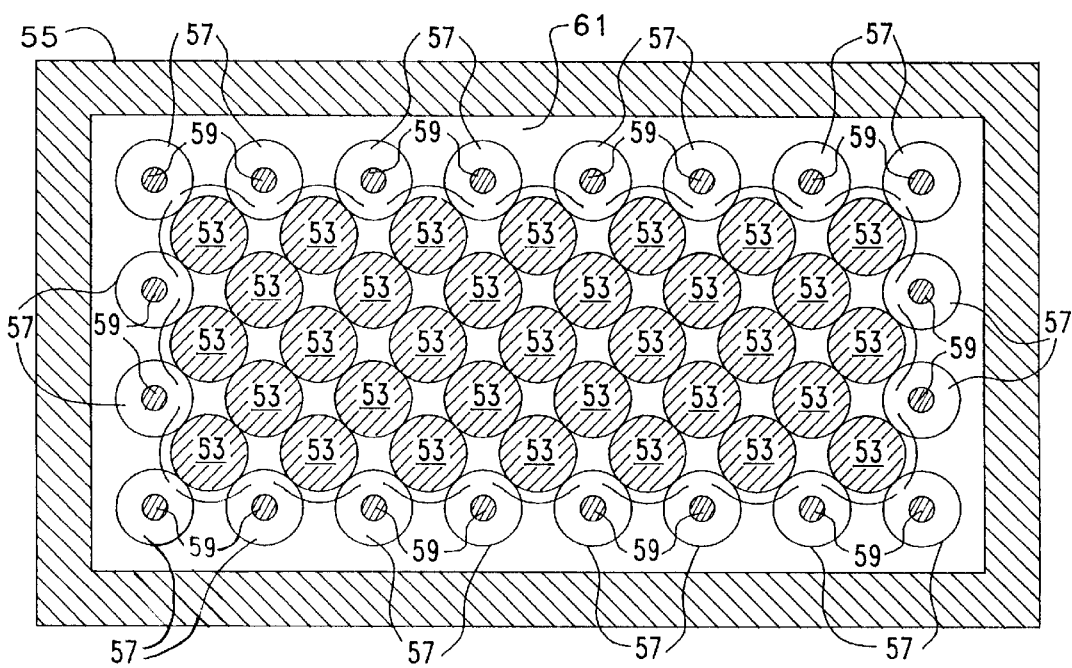
Figure 9C:
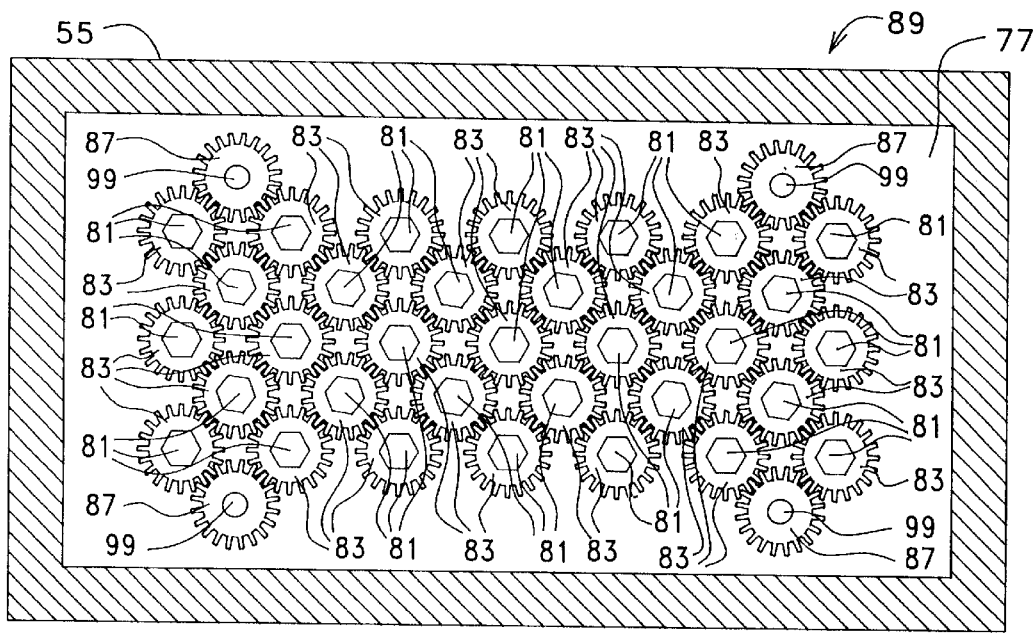
Figure 9D:
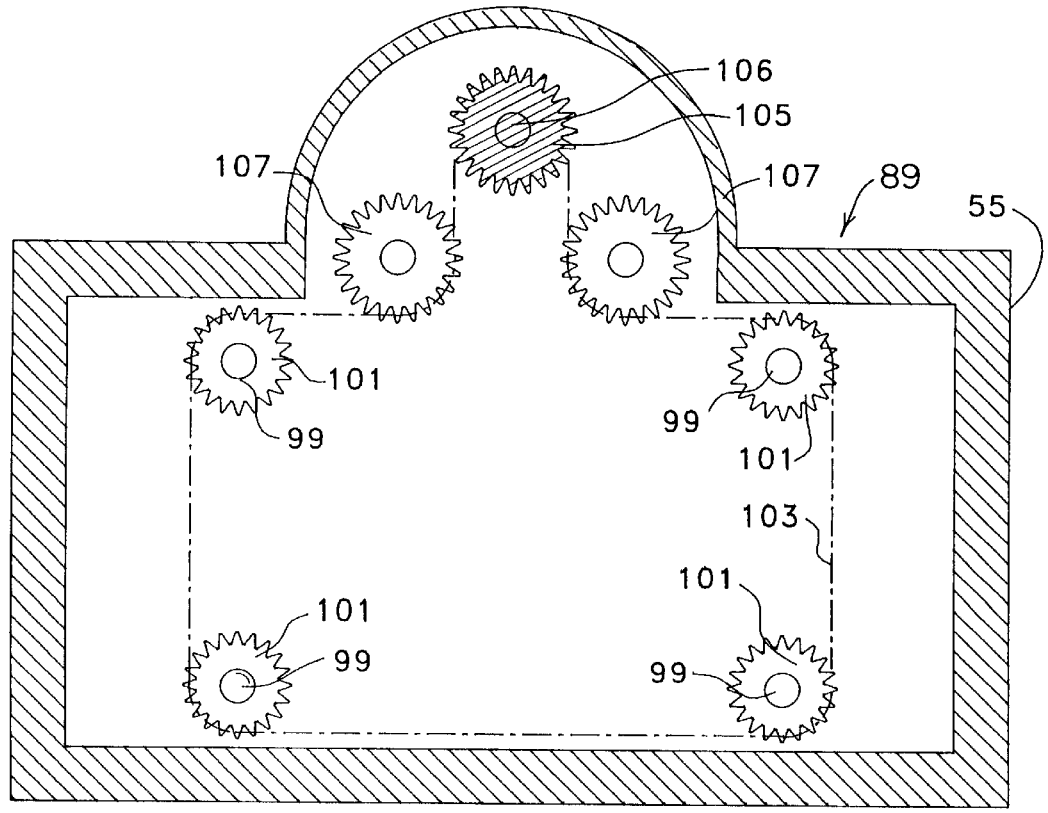
Figure 12:
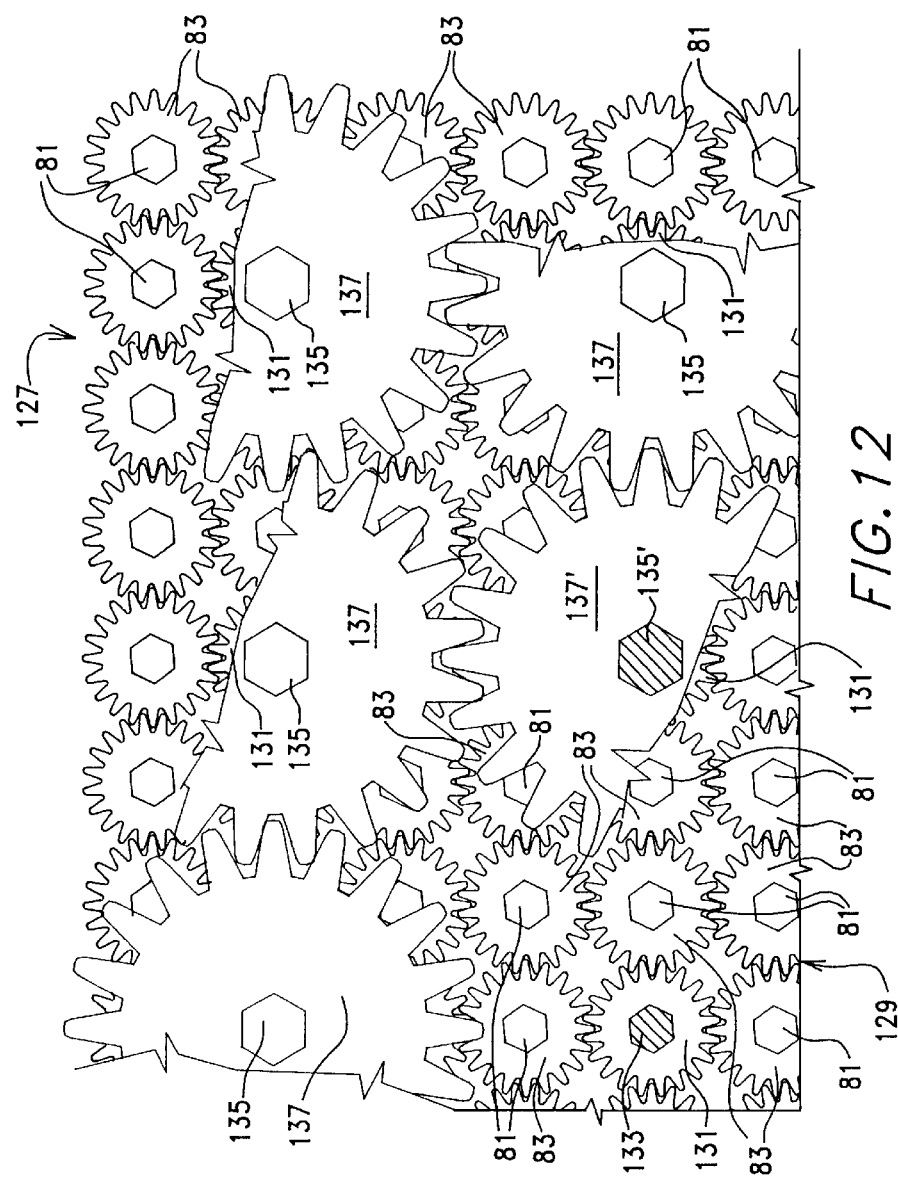
FIG. 12 is a partial sectional illustration with cut away portions illustrating an alternative drive system for an array of cutting bits as shown in the apparatus of FIG. 7.

FIG. 12 shows an alternative drive system for a tool including an array of bits as shown in FIG. 7. System 127 includes multiple arrays 129 of eight gears 83 (mounted as referenced in FIG. 8C) clustered around a central drive gear 131 keyed to a drive shaft 133. All of the gears 83 and gear 131 are keyed to shafts which drive bits as shown in FIG. 8C, but the center shaft 133 of each array extends through related gear 131 and at its other end 135 is increased in diameter. The enlarged ends 135 of shafts 133 are each keyed to a large drive gear 137 having a pitch diameter three times that of gears 83/131.

A central one (137', for example) of the drive gears 137 is keyed to a central drive shaft 135' which is directly, or through appropriate gear train, driven by a motor (not shown). As many as nine arrays of nine drill bits each can fit into a square cluster of 81 total bits all driven from a central shaft 135' and drive gear 137'. For a 2"×6" wood product end face, a cluster of three such arrays 129 serially arranged with shaft 81/131 spacing at about ¾" (center to center) will result in a correct bore array in the end face.

All shafts are mounted in bearings (in a bulkhead or associated bulkhead sections, for example, which separate the planes of gears 83/131 and drive gears 137).

Figure 13:
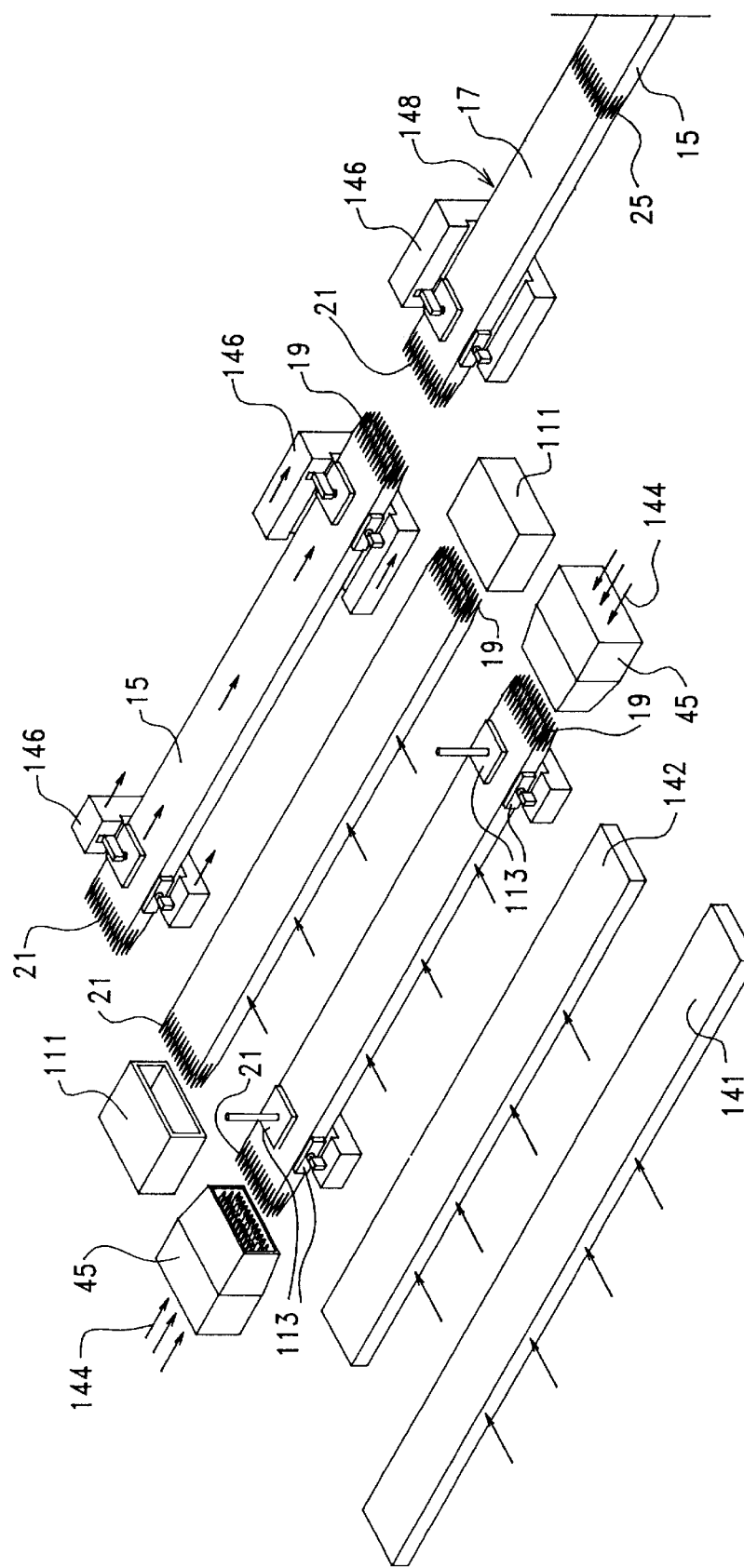
FIG. 13 is a perspective illustration showing an alternative method/combination for carrying out joint architecture formation and securement.

FIG. 13 illustrates an alternative arrangement of components in a combination tool for joint formation utilizing apparatus 45 wherein smaller wood product sections 15/17 are utilized to form a wood product having a plurality of joints 25 therein (many reference numerals refer to components previously discussed with respect to the embodiment of FIG. 10). Unprepared wood section 141 is prepared, ends square cut and cut to length, providing length standardized wood product section 142. Section 142 is carried (for example, on a conveyor) to a first station where the section is centered and clamped (113).

Joint architectures 21 and 19 are formed at each end using apparatuses 45, with movement at a controlled feed rate and thrust in directions 144 (for example, by apparatus movement on guides maintained axial to the wood product section). At a subsequent station, each end has adhesive applied thereto (at 111). The thus appropriately prepared wood product section 15 is then deposited at high strength clamping system 146 for securement of end 19 to end 21 of the previously formed wood product section 17 to form another joint 25 in a multi-jointed wood product 148.

As may be appreciated from the foregoing, many deviations from, and alternatives to, the methods and apparatus embodiments of this invention as disclosed hereinabove may be conceived of which would as well accomplish the purposes of the improved finger joint architecture of this invention.

What is claimed is:

1. A wood product having substantial continuity of wood grain direction between ends of said wood product and formed from at least first and second wood product sections adhesively secured at a joint located between said ends, said joint characterized by a joint cross section showing plural endless nonlinear adhesive lines defining plural first and second section interfaces entirely interior said joint cross section.

2. The wood product of claim 1 wherein said wood grain direction is substantially parallel to length of said wood product and wherein said joint includes a finger joint formation at each joined end of said sections, said finger joint formation including a plurality of longitudinal bores at said joined end.

3. The wood product of claim 2 wherein said finger joint formation includes a plurality of tenons defined by said bores at said joined end.

4. The wood product of claim 3 wherein said tenons and bores are tapered, direction of taper of said tenons being opposite direction of taper of said bores.

5. The wood product of claim 1 wherein said wood product is further characterized by said joint cross section showing plural rows of said interfaces.

6. A wood product having a wood grain direction between ends of said wood product and formed from at least first and second wood product sections adhesively secured at a joint located between said ends, said wood product having an exterior surface, said joint characterized by rows of interrelated bores and tenons formed at both said wood product sections adjacent to said joint, at least some of both said bores and tenons being located entirely internal said exterior surface of said wood product.

7. The wood product of claim 6 wherein said tenons are linearly arranged and plural said rows of said linearly arranged tenons are provided.

8. The wood product of claim 6 wherein said bores are conical.

9. The wood product of claim 8 wherein said bores are linearly arranged and plural said rows of said linearly arranged bores are provided.

10. The wood product of claim 6 wherein said bores and tenons define a joint cross section showing plural nonlinear adhesive lines.

11. The wood product of claim 6 wherein said wood product is formed of a multiplicity of wood product sections each adhesively secured to another at a said joint.

* * * * *